(12) United States Patent
Zhang

(10) Patent No.: US 10,126,574 B2
(45) Date of Patent: Nov. 13, 2018

(54) RUBBING ROLLER

(71) Applicants: BOE Technology Group Co., Ltd., Beijing (CN); Hefei Xinsheng Optoelectronics Technology Co., Ltd., Anhui (CN)

(72) Inventor: Wei Zhang, Nagoya (JP)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 306 days.

(21) Appl. No.: 15/082,838

(22) Filed: Mar. 28, 2016

(65) Prior Publication Data

US 2017/0023811 A1     Jan. 26, 2017

(30) Foreign Application Priority Data

Jul. 23, 2015  (CN) .......................... 2015 1 0443211

(51) Int. Cl.
G02F 1/13      (2006.01)
G02F 1/1337    (2006.01)

(52) U.S. Cl.
CPC ...... G02F 1/1303 (2013.01); G02F 1/133784 (2013.01)

(58) Field of Classification Search
CPC .......................... G02F 1/1303; G02F 1/133784
USPC ............ 492/17, 27, 28, 48, 57, 60; 349/123, 349/124, 126, 127
See application file for complete search history.

(56) References Cited

U.S. PATENT DOCUMENTS 1,875,257 A * 8/1932 Nylund .................... B24D 9/04
                                                              451/490
2,335,594 A * 11/1943 Kerr ........................ A01F 11/06
                                                              198/586
2,881,461 A * 4/1959 Parker ................. B05C 17/0227
                                                              15/230.11
3,807,982 A * 4/1974 Claassen ............... C03B 27/044
                                                              193/37

(Continued)

FOREIGN PATENT DOCUMENTS

CN      101681066 A      3/2010
JP      H0637005 A       2/1994

(Continued)

OTHER PUBLICATIONS

Aug. 15, 2017—(CN) Office Action application CN 201510443211.7 with English Translation.

*Primary Examiner* — Jason L Vaughan
(74) *Attorney, Agent, or Firm* — Banner & Witcoff, Ltd.

(57) ABSTRACT

A rubbing roller is disclosed, which includes a cylindrical roller mandrel and a rubbing fabric in close contact with an outer surface of the roller mandrel; the rubbing fabric includes a first end face, an outer side face and a second end face in this order along an axial direction of the roller mandrel, and the first end face and the second end face are connected through the outer side; the outer side face of the rubbing fabric, at the first and second end faces, has a distance d1 from an axial line of the roller mandrel; the outer side face of the rubbing fabric, at a first cross section between the first and second end faces, has a distance d2 from the axial line of the roller mandrel, and d1>d2.

14 Claims, 3 Drawing Sheets

(56) References Cited

U.S. PATENT DOCUMENTS

| | | | | |
|---|---|---|---|---|
| 4,042,804 A | * | 8/1977 | Moser | G03G 15/206 |
| | | | | 219/216 |
| T967,010 I4 | * | 2/1978 | Stryjewski | G03G 15/0253 |
| | | | | 100/328 |
| 6,665,512 B1 | * | 12/2003 | Yanagida | G03G 15/1685 |
| | | | | 399/308 |
| 9,751,710 B2 | * | 9/2017 | Newhouse | B65H 27/00 |

FOREIGN PATENT DOCUMENTS

| | | |
|---|---|---|
| JP | 2004093676 A | 3/2004 |
| JP | 2012021160 A | 2/2012 |
| KR | 1020040059603 A | 7/2004 |
| KR | 1020080053700 A | 6/2008 |

* cited by examiner

RUBBING ROLLER

This application claims priority to and the benefit of Chinese Patent Application No. 201510443211.7 filed on Jul. 23, 2015, which application is incorporated herein in its entirety.

TECHNICAL FIELD

Embodiments of the present disclosure relates to a rubbing roller used for the crystal molecule alignment on a substrate.

BACKGROUND

In thin film transistor (TFT-LCD) display technologies, the predominant methods for achieving initial alignment of liquid crystal molecules include rubbing a polyimide (PI) film layer so as to form an alignment layer on an array substrate and a color filter substrate. In a rubbing process, a rubbing roller is an important component for rubbing a polyimide film layer. A rubbing roller usually comprises a roller mandrel, a rubbing fabric and an adhesive tape, and the rubbing fabric is wrapped around the outer surface of the roller mandrel via the adhesive tape. With the roller mandrel being rolled, it is possible to achieve a rubbing treatment against a polyimide film layer, thus the rubbed polyimide film layer can achieve the initial alignment of crystal molecule molecules in operation in a TFT-LCD.

SUMMARY

An embodiment of the present disclosure provides a rubbing roller comprising a cylindrical roller mandrel and a rubbing fabric in close contact with an outer surface of the roller mandrel; the rubbing fabric comprises a first end face, an outer side face and a second end face in this order along an axial direction of the roller mandrel, and the first end face and the second end face are connected through the outer side; the outer side face of the rubbing fabric, at the first and second end faces, has a distance d1 from an axial line of the roller mandrel; the outer side face of the rubbing fabric, at a first cross section between the first and second end faces, has a distance d2 from the axial line of the roller mandrel, and d1>d2, and the outer side face of the rubbing fabric, from the first or second end face to the first cross section, has a distance from the axial line of the roller mandrel decreasing smoothly from d1 to d2.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

As the requirements for picture quality of a display unit are becoming higher and higher, the requirements for rubbing homogeneity on an alignment layer is also getting higher. By regulating the pressing amount during the process of rubbing, the display defects, such as rubbing mura, rubbing block or the like, may be depressed; rubbing mura is alleviated with the increase of the pressing amount of rubbing, and rubbing block is increased with the increase of the pressing amount of rubbing. A rubbing roller always suffers from slight deformation in its longitudinal direction, and especially, when the rubbing roller has a relatively longer length, such deformation becomes even more. Existence of the rubbing roller deformation causes the above-mentioned display defects in the process of rubbing an alignment film, and the regulation of pressing amount of rubbing is unable to eliminate simultaneously these two rubbing defects, thus influencing the yield rate and display quality.

Figure 4:
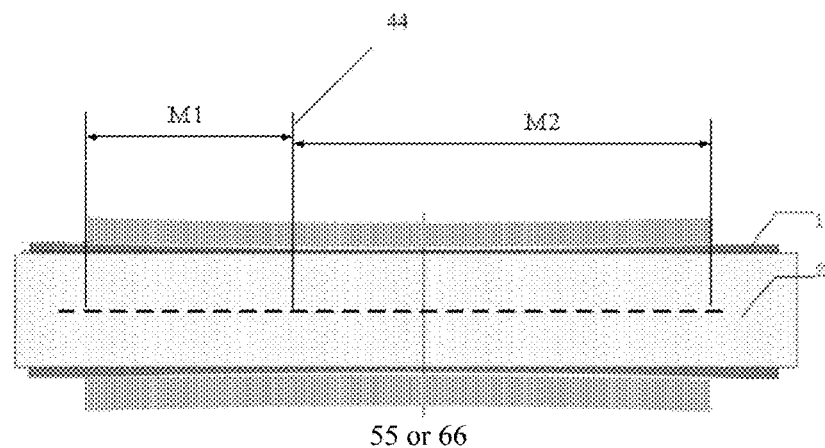
FIG. 4 is a schematic diagram showing the axial line length of a roller mandrel corresponding to a first transitional part and a second transitional part.
Figure 5:
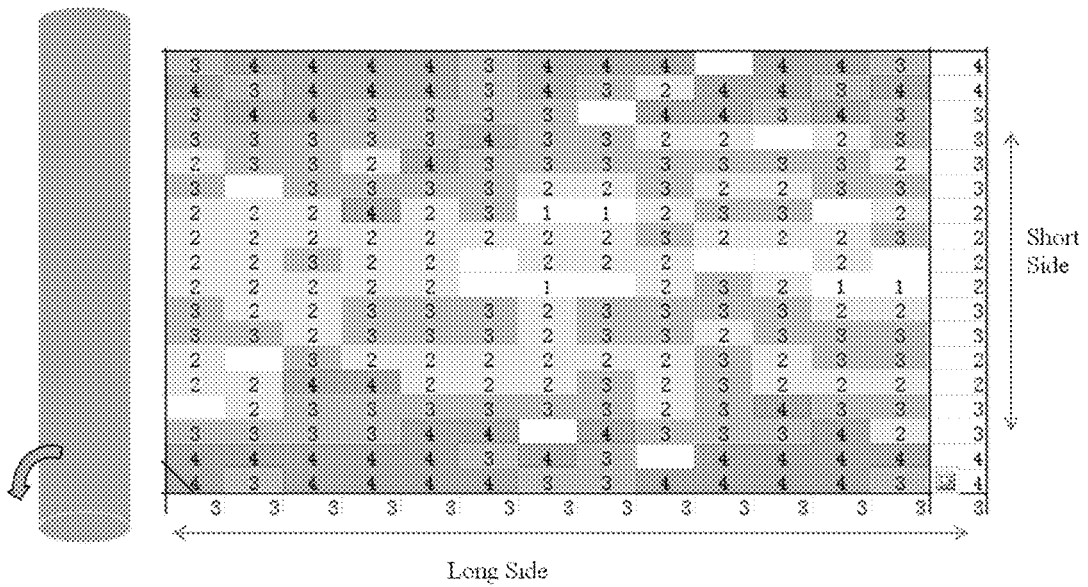
FIG. 5 illustrates the distribution of rubbing mura on a first substrate.
Figure 6:
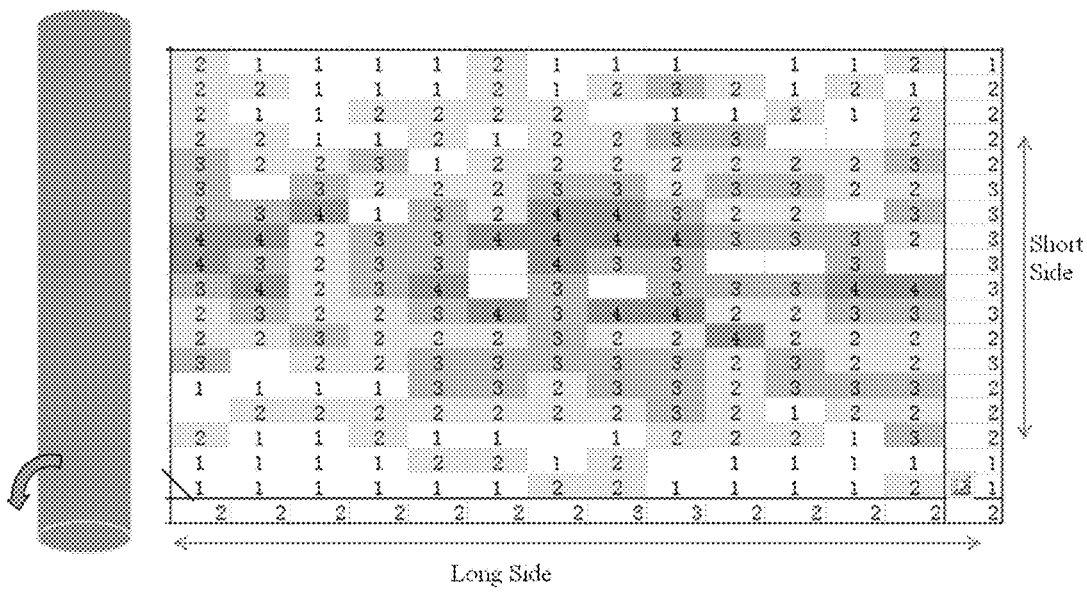
FIG. 6 illustrates the distribution of rubbing block on a first substrate.

FIGS. 5 and 6 shows the distribution, on the first substrate, of rubbing mura and rubbing block, respectively, which are produced after the rubbing alignment performed with a common rubbing roller. From showing of FIGS. 5 and 6, it would be appreciated that rubbing mura and rubbing block appear simultaneously on a first substrate. The numbers 1, 2, 3 and 4 as shown in FIG. 4 indicate the degree of rubbing defects, and the sequence from 1 to 4 means gradual increase of the rubbing defects. Such a situation, where rubbing mura and rubbing block appear simultaneously on the first substrate, is connection with the deformation of the rubbing roller. Rubbing defects are caused by this kind of rubbing roller deformation, can not be eliminated through technology regulation, and therefore would have a strong impact on the yield rate and display quality.

A rubbing roller according to one embodiment of the present disclosure comprises: a cylindrical roller mandrel and a rubbing fabric tightly attached to the lateral surface of the roller mandrel; the rubbing fabric comprises a first end face, an outer side face and a second end face in this order along the axial direction of the roller mandrel, and the first end face and the second end face are connected through the outer side. At the first end face and the second end face, the distance between the outside side and the axis of the roller mandrel is d1; at a first cross section between the first and second end faces, the distance from the axial line of the roller mandrel to the outer side face of the rubbing fabric is d2, and d1>d2. The outer side face of the rubbing fabric, from the first end face or the second end face to the first cross section, has a distance, from the axial line of the roller mandrel to the outer side face of the rubbing fabric, decreasing smoothly (i.e., continuously) from d1 to d2. The cylindrical roller mandrel described in any embodiment of the present disclosure is not strictly required to be of a standard cylinder, for example, the cross sections at different axial positions may have their diameters different from each other, or alternatively, the cross sections taken along the axial line of the roller mandrel may also not be of standard circles. The first cross section may be located at any position between the first end face and the second end face, and in this way, the outer side face of the rubbing fabric is divided into a first transitional surface and a second transitional surface by the first cross section.

Figure 1:
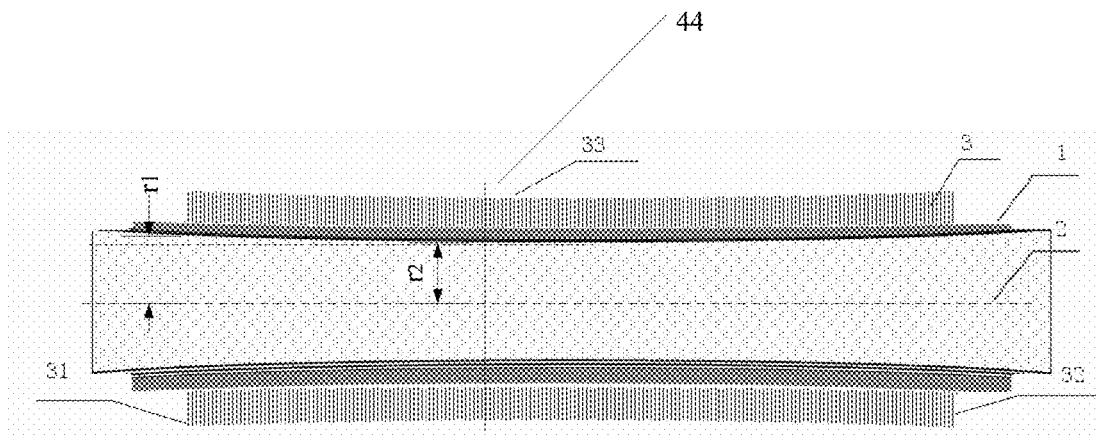
FIG. 1 is a sectional view along the axial line of a rubbing roller when only the roller mandrel thereof is used to provide compensation according to an embodiment of present disclosure.
Figure 2:
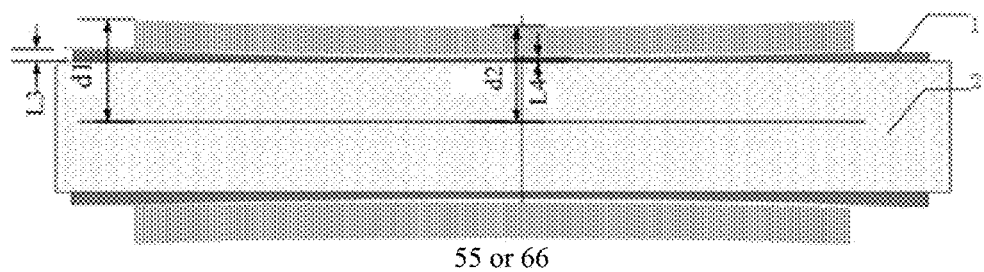
FIG. 2 is a sectional view along the axial line of a rubbing roller when only an adhesive tape is used to perform deformation compensation according to an embodiment of present disclosure.
Figure 3:
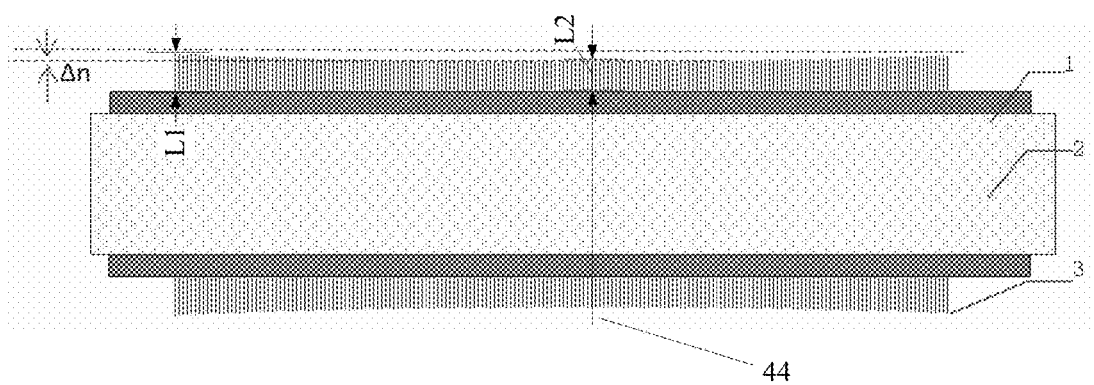
FIG. 3 is a sectional view along the axial line of a rubbing roller when only a rubbing fabric is used to perform deformation compensation according to an embodiment of present disclosure.

It should be noted that, after the rubbing fabric 3 is attached against the outer surface of the roller mandrel 2, the two ends of the rubbing fabric 3 generally do not go beyond the two ends of the roller mandrel 2, with reference to FIGS. 1, 2 and 3. The two ends of the rubbing fabric may have their distances from the corresponding ends of the roller mandrel 2 that are identical to or different from each other, for example, however, in the case where the distances are identical to each other, the rubbing process can have a much better homogeneous rubbing effect. In the case where the two ends of the rubbing fabric 3 have identical distances from their corresponding ends of the roller mandrel 2, the rubbing roller can be essentially in bilateral symmetry architecture with respect to the second central cross section 66 taken at the center of the roller mandrel 2 in the axial direction of the roller mandrel 2. After the rubbing fabric 3 is attached to the roller mandrel 2, for example, the cross section taken at the center of the roller mandrel 2 in its axial direction does not always coincide with the cross section taken at the position of the rubbing roller that has identical distances from the two end faces of the rubbing fabric 3 in the axial direction of the roller mandrel 2. Therefore as stated above, the cross section, taken at the center of the roller mandrel 2 in its axial direction, is defined as the second central cross section 66, while the cross section at the position of the rubbing roller that has identical distances from the two end faces of the rubbing fabric 3 in the axial direction of the roller mandrel 2 is defined as the first central cross section 55.

In the embodiments of the present disclosure, the rubbing fabric 3 is for example of a rectangle shape in its unfolding condition before being affixed to the outer surface of the roller mandrel 2.

The deformation of the rubbing roller during rubbing a glass substrate may be reflected as the changes in the distance of the outer side face 33 of the rubbing fabric 3 to the axial line of the roller mandrel 2. Referring to FIGS. 1, 2 and 3, according to the embodiments of present disclosure, for the rubbing rollers, the diameter of the roller mandrel 2 is gradually decreased from its two ends toward its center, or the thickness of the rubbing fabric 3 is gradually decreased from its two ends toward its center, or the thickness of the adhesive tape 1 is gradually decreased from its two ends toward its center, or the above modes are implemented in any combination, it is possible to achieve deformation compensation of the rubbing roller. The centers of the roller mandrel, the rubbing fabric, and the adhesive tape can coincide with one another.

Whether a single compensation mode or the cooperation of several compensation modes is employed would influence the difficulty of the processing technology or the compensation effect. For example, if only the mode of direct compensation of the roller mandrel 2 is used, the roller mandrel 2 is manufactured with a greater process load, but the compensation effect is preferable; if only the rubbing fabric 3 is used to perform the compensation, the manufacturing process is simpler, but the uniformity of the compensation is relatively poor. Therefore, the compensation effect and the technology difficulty may be considered collectively in selection of the modes. For example, a combination compensation by means of both the roller mandrel 2 and the rubbing fabric 3 may be available, in this way, the process load for manufacturing the roller mandrel is properly decreased, the technology difficulty is simplified, while an appropriate compensation effect can be obtained.

Assuming that the distance of the outer side face 33 of the rubbing fabric 3 at the first cross section 44 to the axial line of the roller mandrel is d2, the distance of the outer side face 33 of the rubbing fabric 3 at its two ends to the axial line of the roller mandrel 2 is d1, since the distance decreases smoothly from d1 to d2 along the axial line of the roller mandrel 2, it can be derived that the distance d2 is the shortest distance to the axial line of the roller mandrel 2. For example, the first cross section 44 may be located at the right center between the first end face 31 and the second end face 32 of the rubbing fabric 3, that is, the first cross section 44 has an identical distance to the two end faces. In the case where the first transitional surface and the second transitional surface of the outer side face 33 have essentially the identical variations, the deformation compensation would produce the required effect. In practice, a certain allowance or margin may be permitted, that is to say, a proper compensation effect can also be achieved if the cross section (i.e., the first central cross section 55) in the middle between the first end face 31 and the second end face 32 of the rubbing roller is within a certain distance range extending from the center to the left and right directions. For example, as stated above, the cross section taken along the rubbing roller at a position having identical distances from the first end face 31 and the second end face 32 is defined as the first central cross section 55, and the first cross section 44 may be located within a certain range to the left and right direction with respect to the first central cross section 55 between the first end face 31 and the second end face 32. For example, if the first cross section 44 is located within a range delimited by an extension of ⅛ of the distance between the two end faces from the first central cross section 55 toward the two ends along the axial line, favorable deformation compensation can be achieved. For the convenience of description, such a range can also be defined in another manner, with reference to FIG. 4, that is, the first transitional surface of the outer side face of the rubbing fabric 3 between the first cross section 44 and the first end face 31 corresponds an axial length M1 of the roller mandrel, and the second transitional surface of the outer side face 33 of the rubbing fabric 3 between the first cross section 44 and the second end face 32 corresponds to an axial length M2 of the roller mandrel 2, and the condition of 3/5≤M1/M2≤5/3 is satisfied. If the condition is satisfied that the first cross section 44 is located within a range delimited by an extension of ⅛ of the distance between the two end faces from the first central cross section 55 toward the two ends along the axial line, or for M1 and M2, 3/5≤M1/M2≤5/3, it is possible to achieve an even required deformation compensation for the rubbing roller in the rubbing process, thus improving the rubbing homogeneity.

The material for the roller mandrel 2 of the rubbing roller may be a metal material for example, and the length thereof can be selected differently to a certain extent according to an actual requirement. For example, a rubbing roller in a high-generation production line for TFT-LCDs generally has a longer length and thus suffers from greater deformation; and the deformation is also in connection with the employed material and/or the material manufacture or the like factors. Generally, the maximum deformation of the used rubbing roller is within a certain range, by a certain given design margin, for example, d1−d2=0.2−0.8 mm can meet the requirement for deformation compensation. In consideration of the material for the rubbing roller mainly employed at present, if the d1−d2 is selected to be 0.4−0.6 mm, then required better compensation effect would generally be achieved.

In specific implementations, as shown in FIG. 1, the deformation compensation for the rubbing roller can be the compensation with the roller mandrel 2 only. For example, the shape design of the roller mandrel 2 may be a smooth decrease from its two ends toward the center. The radius of the roller mandrel 2 at the first cross section 44 is r2, the radius of the roller mandrel 2 at locations corresponding to the first end face 31 and the second end face 32 of the rubbing fabric is r1, the required compensation amount is d1−d2, where r1−r2=d1−d2, thus the compensation at the first cross section 44 is provided entirely by the roller mandrel 2. Generally, it should be specified that, during the manufacture of the rubbing roller in practice, the first cross section 44 essentially coincides with the second central cross section 66 taken along the roller mandrel at its axial center, and also coincides with the first central cross section 55 of the rubbing roller, since, because in this way, it can be even better ensured that the two ends of the second central cross section 66 of the roller mandrel 2 are subjected to uniform force, and the rubbing effect may also be more homogeneous. Taking the technology difficulty and compensation effect into consideration, the deformation compensation at the position other than the first cross section 44 is also compensated through the roller mandrel 2, because if the deformation at other positions is compensated through the adhesive tape 1 or the rubbing fabric 3, it is required to prepare both the roller mandrel 2 and the rubbing fabric 3 or both the roller mandrel 2 and the adhesive tape 1 in a shape have a gradational thickness along the axis line, which would greatly increase the technology complexity, and such a technology is difficult to achieve in specific operation. The roller mandrel 2 of this type has its structure which can be prepared by means of ordinary machine work in specific applications.

In one specific embodiment, the compensation may also be realized through both the roller mandrel 2 and the rubbing fabric jointly. For example, assuming that the first cross section 44 of the rubbing fabric 3 has identical distances from the first end face 31 and second end face 32, and in this case, the first cross section 44 and the first central cross section 55 coincide with each other; and at the same time, the first cross section 44 also coincides with the second central cross section 66 of the roller mandrel 2 in its axial direction. The cross section of the roller mandrel 2 is designed in such a configuration with diameters decreasing smoothly from two ends toward the center, and also the rubbing fabric 3 is also designed in such a configuration with thicknesses gradually decreasing from its two ends toward the center in the axial direction of the roller mandrel 2. Specifically, assuming that the thickness of the rubbing fabric 3 at the first end face 31 and the second end face 32 is L1, the cross section radius of the roller mandrel 2 at locations corresponding the first end face 31 and the second end face 32 of the rubbing fabric 3 is r1. At the first cross section 44, or at the second axial central cross section 66 of the roller mandrel 2, or at the first central cross section 55 of the rubbing roller, the radius of the roller mandrel is r2, and the thickness of the rubbing fabric 3 is L2; the relationship where (L1+r1)−(L2+r2)=(d1−d2) is satisfied. To be specified, at this first cross section 44, the compensation is provided through the roller mandrel 2 and the rubbing fabric 3 jointly, and at other positions, the compensation is also provided jointly through the roller mandrel 2 and the rubbing fabric 3, in this way, it is possible to not only make the process simpler, but also achieve a still better compensation effect.

In a specific embodiment, with reference to FIG. 3, the compensation may also be provided solely through the rubbing fabric 3, that is, the rubbing fabric 3 is designed to decrease smoothly from the first end face 31 and the second end face 32 toward the first cross section. Specifically, for example, the rubbing fabric 3 has a thickness of L1 at both the first end face 31 and the second end face 32; the rubbing fabric 3 has a thickness of L2 at the first cross section 44 (in FIG. 3, the first cross section 44 essentially coincides with the first central cross section 55 and the second central cross section 66); the relationship where L1−L2=d1−d2 is satisfied. An shown in FIG. 3 is d1−d2; in the case where only the rubbing fabric 3 is used for providing the compensation, the technology is simpler.

In a specific embodiment, the adhesive tape is used to allow the rubbing fabric 3 to be adhered to the outer surface of the roller mandrel 2. The adhesive tape 1 has a certain thickness. For saving cost and simplifying technology, for example, the adhesive tape 1 may be designed in a configuration having thicknesses decreasing smoothly from its two ends toward the center (the two ends of the adhesive tape 1 refer to the two end faces of the roller mandrel 2 in its axial direction after it is wrapped around the outer surface of the roller mandrel 2); for example, referring FIG. 2, it is possible to use only the adhesive tape 1 to perform the deformation compensation. The details are as follows: the thickness of the adhesive tape 1 at locations corresponding to the first end face 31 and the second end face 32 of the rubbing fabric 3 is L3, the thickness thereof at the first cross section 44 (in FIG. 2, the first cross section 44 coincides with the first central cross section 55 and the second central cross section 66), and the relationship in which (L3−L4)=(d1−d2) is satisfied. The first central cross section as shown in FIG. 2 has identical distances from the first end face 31 and the second end face 32, that is, the first cross section 44 coincides with the first central cross section 55, and at the same time, the first central cross section 55 of the rubbing roller also coincides with the second central cross section 66 of the roller mandrel 2.

The adhesive tape 1 may also perform the deformation compensation together with the roller mandrel 2 and the rubbing fabric 3, for example, at the first cross section 44, the radius of the roller mandrel 2 is r2, the thickness of the rubbing fabric 3 is L2, the thickness of the adhesive tape 1 is L4, and the relationship where (r2+L2+L4)=d2 is satisfied. Here, if the roller mandrel 2, the adhesive tape 1 and the rubbing fabric 3 perform the compensation jointly, it is not required to define the two ends, because, by this time, at positions corresponding to the first end face 31 and the second end face 32 of the rubbing fabric 3, the sum of the thickness of the rubbing fabric 3, the thickness of the adhesive tape 1 and the radius of the roller mandrel 2 is equal to d1.

Various embodiments of the present disclosure may comprise at least one of the beneficial effects as follows.

An embodiment of the present disclosure smoothly decreases the distance of the rubbing fabric outer side face of the rubbing roller to the axial line of the roller mandrel from its two ends toward the center, and the deformation compensation in the longitudinal direction of the rubbing roller is achieved, so that the pressing amount of rubbing in the rubbing process becomes more uniform, and the yield rate is improved.

An embodiment of the present disclosure selects the position of the first cross section of the rubbing fabric between the first and second end faces, that is, and allow the position of the first cross section to be in the range defined by an extension of ⅛ of the distance from the first central cross section toward both sides, which can compensate the deformation of the rubbing roller better, and improve the rubbing effect.

An embodiment of the present disclosure allows the first cross section of the rubbing fabric to have identical distances from the two end faces, and allows the first transitional surface and the second transitional surface of the outer side face of the rubbing fabric to be identical, which further increases the compensation homogeneity.

In an embodiment of the present disclosure, the compensation of the embodiment of the present disclosure can be realized through the modes of roller mandrel compensation, rubbing fabric compensation or adhesive tape compensation, or an optional combination of the above three modes, and therefore effective compensation for the rubbing roller deformation can be realized as well; and with different combination of the compensation modes, it is possible to simplify the technology, increase the compensation effect and the like.

An embodiment of the present disclosure makes the extent of the difference between the maximum distance and the minimum distance from the outer side face of the rubbing fabric to the axial line of the roller mandrel so as to control the compensation amount in a reasonable scope, which can further avoid rubbing defects.

The above specific embodiments may be combined with each other, which does not go beyond the scope disclosed by the present disclosure, and can bring about required combination effect.

What is claimed is:

1. A rubbing roller comprising a cylindrical roller mandrel and a rubbing fabric in close contact with an outer surface of the roller mandrel,
    wherein the rubbing fabric comprises a first end face, an outer side face and a second end face in this order along an axial direction of the roller mandrel, and the first end face and the second end face are connected through the outer side face;
    the outer side face of the rubbing fabric, at the first and second end faces, has a distance d1 from an axial line of the roller mandrel; the outer side face of the rubbing fabric, at a first cross section between the first and second end faces, has a distance d2 from the axial line of the roller mandrel, and d1>d2; and the outer side face of the rubbing fabric, from the first or second end face to the first cross section, has a distance from the axial line of the roller mandrel decreasing smoothly from d1 to d2;
    wherein a cross section radius of the roller mandrel decreases smoothly from its two ends toward its center;
    wherein a thickness of the rubbing fabric decreases smoothly from the first and second end faces toward the center in the axial direction of the roller mandrel;
    wherein the rubbing fabric is joined to the outer surface of the roller mandrel by means of an adhesive tape; and
    wherein a thickness of the adhesive tape decreases smoothly from its two ends toward a center of the adhesive tape in the axial direction of the roller mandrel.

2. The rubbing roller according to claim 1, wherein the outer side face comprises a first transitional surface between the first end face and the first cross section, and a second transitional surface between the second end face and the first cross section;
    the first transitional surface corresponds to a length M1 of the axial line of the roller mandrel: and the second transitional surface corresponds to a length M2 of the axial line of the roller mandrel, where $3/5 \leq M1/M2 \leq 5/3$.

3. The rubbing roller according to claim 2, wherein the first transitional surface is equal to the second transitional surface.

4. The rubbing roller according to claim 1, wherein a first distance of the first cross section to the first end face is equal to a second distance of the first cross section to the second end face.

5. The rubbing roller according to claim 1, wherein d1 and d2 satisfy $0.2 \text{ mm} \leq d1-d2 \leq 0.8 \text{ mm}$.

6. The rubbing roller according to claim 1, wherein d1 and d2 satisfy $0.4 \text{ mm} \leq d1-d2 \leq 0.6 \text{ mm}$.

7. The rubbing roller according to claim 1, wherein a cross section radius of the roller mandrel corresponding to the first and second end faces of the rubbing fabric is r1, and a cross section radius of the roller mandrel at the first cross section is r2, where $r1-r2=d1-d2$.

8. The rubbing roller according to claim 1, wherein a thickness of the rubbing fabric at the first and second end faces is L1, the cross section radius of the roller mandrel corresponding to the first and second end faces of the rubbing fabric is r1; and the cross section radius of the roller mandrel at the first cross section is r2, and a thickness of the rubbing fabric at the first cross section is L2, where $(L1+r1)-(L2+r2)=d1-d2$.

9. The rubbing roller according to claim 1, wherein a thickness of the rubbing fabric at the first and second end faces is L1; and a thickness of the rubbing fabric at the first cross section is L2, where $L1-L2=d1-d2$.

10. The rubbing roller according to claim 1, wherein a thickness of the adhesive tape at a location corresponding to the first and second end faces of the rubbing fabric is L3, and a thickness of the adhesive tape at the first cross section is L4, where $L3-L4=d1-d2$.

11. A rubbing roller comprising a cylindrical roller mandrel and a rubbing fabric in close contact with an outer surface of the roller mandrel,
    wherein the rubbing fabric comprises a first end face, an outer side face and a second end face in this order along an axial direction of the roller mandrel, and the first end face and the second end face are connected through the outer side face;
    the outer side face of the rubbing fabric, at the first and second end faces, has a distance d1 from an axial line of the roller mandrel; the outer side face of the rubbing fabric, at a first cross section between the first and second end faces, has a distance d2 from the axial line of the roller mandrel, and d1>d2; and the outer side face of the rubbing fabric, from the first or second end face to the first cross section, has a distance from the axial line of the roller mandrel decreasing smoothly from d1 to d2;

wherein a thickness of the rubbing fabric decreases smoothly from the first and second end faces toward the center in the axial direction of the roller mandrel; and wherein a cross section radius of the roller mandrel decreases smoothly from its two ends toward its center.

12. The rubbing roller according to claim 11, further comprising an adhesive tape, wherein the rubbing fabric is joined to the outer surface of the roller mandrel by means of the adhesive tape; a thickness of the adhesive tape decreases smoothly from its two ends toward a center of the adhesive tape in the axial direction of the roller mandrel; and at the first cross section, the roller mandrel has a radius r2, the rubbing fabric has a thickness L2, and the adhesive tape has a thickness L4, where r2+L2+L4=d2.

13. A rubbing roller comprising a cylindrical roller mandrel and a rubbing fabric in close contact with an outer surface of the roller mandrel, wherein the rubbing fabric comprises a first end face, an outer side face and a second end face in this order along an axial direction of the roller mandrel, and the first end face and the second end face are connected through the outer side face;

the outer side face of the rubbing fabric, at the first and second end faces, has a distance d1 from an axial line of the roller mandrel; the outer side face of the rubbing fabric, at a first cross section between the first and second end faces, has a distance d2 from the axial line of the roller mandrel, and d1>d2; and the outer side face of the rubbing fabric, from the first or second end face to the first cross section, has a distance from the axial line of the roller mandrel decreasing smoothly from d1 to d2;

wherein the rubbing roller includes an adhesive tape, wherein the rubbing fabric is joined to the outer surface of the roller mandrel by means of the adhesive tape;

wherein a thickness of the adhesive tape decreases smoothly from its two ends toward a center of the adhesive tape in the axial direction of the roller mandrel; and wherein a cross section radius of the roller mandrel decreases smoothly from its two ends toward its center.

14. The rubbing roller according to claim 13, wherein a thickness of the rubbing fabric decreases smoothly from the first and second end faces toward a center of the roller mandrel in the axial direction of the roller mandrel.

* * * * *